United States Patent [19]
Chang

[11] Patent Number: 5,221,003
[45] Date of Patent: Jun. 22, 1993

[54] PORTABLE TRAVEL BOX WITH MULTIPLE TRAFFIC PURPOSES

[76] Inventor: Hsiu-Wei Chang, P.O. Box 55-1670, Taipei (10477), Taiwan

[21] Appl. No.: 885,449

[22] Filed: May 20, 1992

[51] Int. Cl.⁵ .................................. B65D 77/04
[52] U.S. Cl. ............................ 206/216; 206/572; 206/573
[58] Field of Search ............... 206/216, 223, 570, 572, 206/573

[56] References Cited

U.S. PATENT DOCUMENTS

| | | | |
|---|---|---|---|
| 3,032,183 | 5/1962 | Magazanik | 206/573 |
| 3,056,495 | 10/1962 | Malachowski | 206/573 |
| 4,194,628 | 3/1980 | Campos | 206/570 |
| 4,830,579 | 5/1989 | Cheng | 206/573 |

FOREIGN PATENT DOCUMENTS 964887 7/1964 United Kingdom ............... 206/570

Primary Examiner—William I. Price

[57] ABSTRACT

A portable travel box includes: a light-reflective plate foldably pivotally secured to a bottom portion of a main case and extendibly retained on a base frame which is extendibly dismantled from a bottom portion of the main case for retroreflective purpose or for a quick flashing warning just by an immediate extending operation of the light-reflective plate for warning a rear car positioned on a rear side of the travel box; an upper cover sealably formed on an upper portion of the main case having a first-aid kit and a tool box respectively detachably stored in an upper chamber formed in an upper portion of the main case to be covered by the upper cover, so that the upper cover can be uncovered and the first-aid kit can be taken out from the case for first aid use, while the tool box may also be taken out from the case for a convenient repair or maintenance job for a case.

12 Claims, 5 Drawing Sheets

PORTABLE TRAVEL BOX WITH MULTIPLE TRAFFIC PURPOSES

BACKGROUND OF THE INVENTION

Whenever using a light-reflective stand in a traffic accident or in a situation of out-of-order of a car ready for repair work, it is always a panic or nervous action for searching and installing the light-reflective stand to thereby delay or deter an emergency warning of the stand and to possibly influence a traffic safety.

It is therefore expected to invent a portable travel box having a light-reflective plate pivotally mounted in the box ready for an erection of the plate for traffic warning purpose and other multiple purposes for a car user.

SUMMARY OF THE INVENTION

The object of the present invention is to provide: a portable travel box including: a light-reflective plate foldably pivotally secured to a bottom portion of a main case and extendibly retained on a base frame which is extendibly dismantled from a bottom portion of the main case for retroreflective purpose or for a quick flashing warning just by an immediate extending operation of the light-reflective plate for warning a rear car positioned on a rear side of the travel box; an upper cover sealably formed on an upper portion of the main case having a first-aid kit and a tool box respectively detachably stored in an upper chamber formed in an upper portion of the main case to be covered by the upper cover, so that the upper cover can be uncovered and the first-aid kit can be taken out from the case for first aid use, while the tool box may also be taken out from the case for a convenient repair or maintenance job for a case.

DETAILED DESCRIPTION

Figure 1:
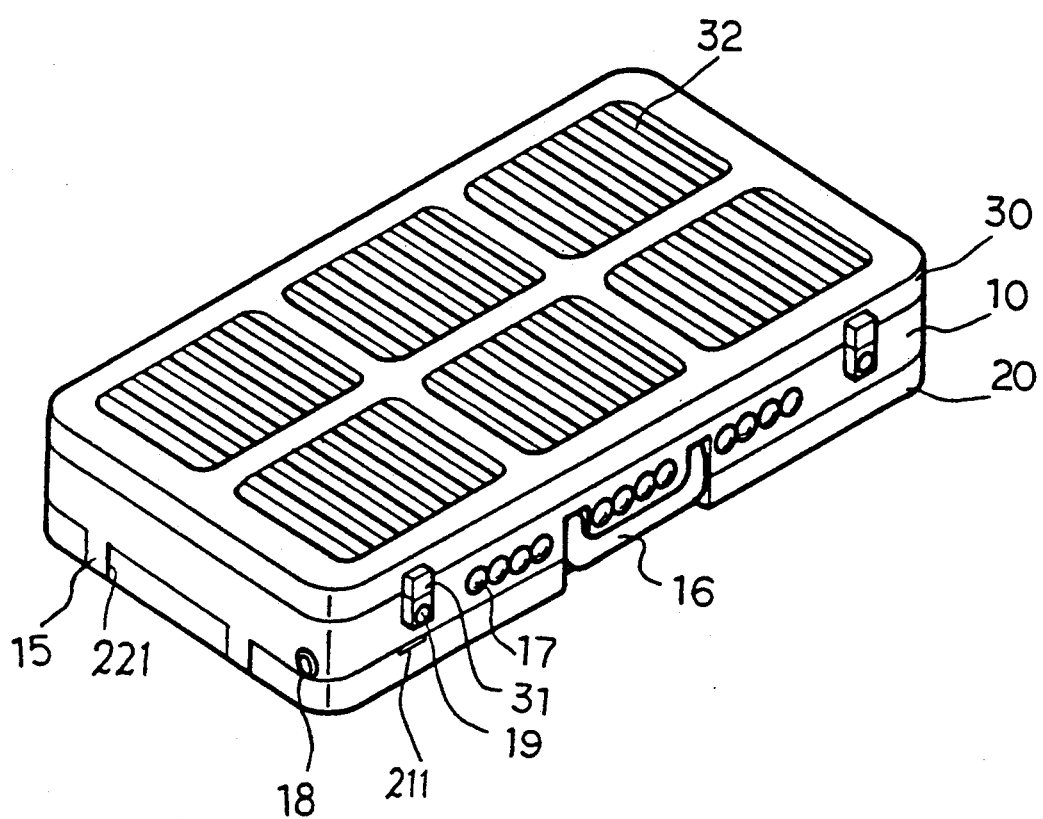
FIG. 1 is a perspective view of the present invention when folded.

As shown in FIGS. 1–5, the present invention comprises: a main case 10, a base frame 20, an upper cover 30 on an upper portion of the main case 10, a main warning means 40, a first-aid kit 50, and a tool box 60.

The main case 10 includes: a parallelepiped case consisting of a first side portion 101, a second side portion 102 positioned on a left side of the first side portion 101, a third side portion 103 positioned on a right side of the first side portion 101 and a fourth side portion 104 positioned on a rear side of the first side portion 101; a first hinge 11 formed on a bottom portion of the case 10 positioned at the second side portion 102 of the case 10 for pivotally securing an upper portion of the main warning means 40; a lower chamber 12 recessed in a bottom portion of the main case 10 for foldably storing the main warning means 40 in the lower chamber 12 when not in use; an upper chamber 13 recessed in an upper portion of the main case 10 for storing the first-aid kit 50 and the tool box 60 in the upper chamber 13 with the upper cover 30 sealably covering the upper chamber 13; a second hinge 14 formed at a third side portion 103 of the main case 10 for pivotally securing the base frame 20 thereon; at least a pair of side latches 15 protruding downwardly from the second side portion 102 of the main case 10 to engage a pair of latch sockets 221 formed in the base frame 20 for combinably engaging the base frame 20 when folding the main warning means 40 into the main case 10 as shown in FIG. 1; and a handle 16 pivotally secured to the first side portion 101 of the main case 10.

The main case 10 is further provided with an auxiliary warning means 17 such as a brake warning light on the first side portion 101 of the main case 10 which may be placed on a rear portion inside a car adjacent to a trunk 70 and a rear window 80 of the car to allow a driver of a rear-side car to observe the auxiliary warning light 17 through the rear window 80. The auxiliary warning means 17 may include a plurality of flashing illuminators parallelly connected to a conventional brake warning light of an electric circuit of the original car electric system, such as through the connector 18 formed in the case 10.

Figure 2:
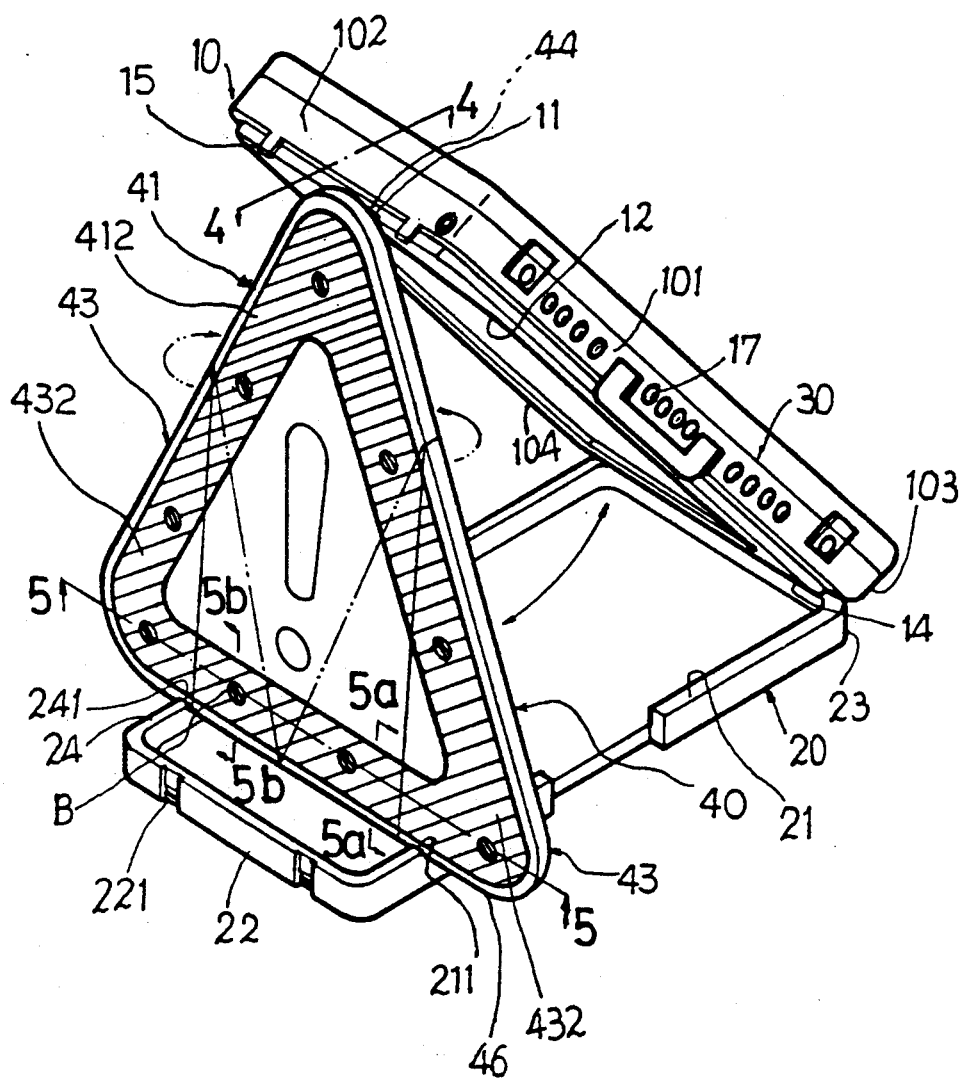
FIG. 2 is an illustration when extending the present invention for warning use.
Figure 3:
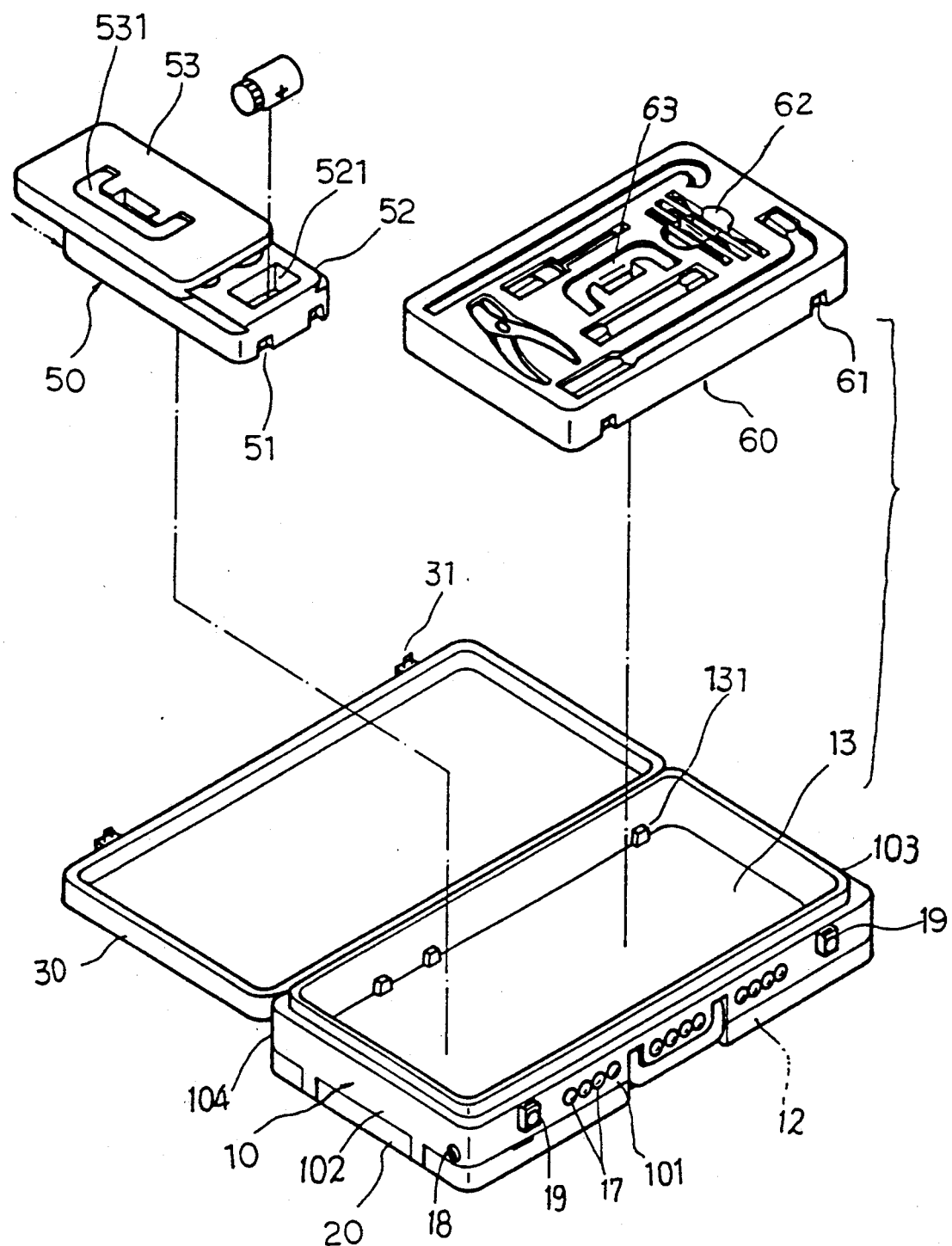
FIG. 3 is an exploded view showing a first-aid kit and a tool box taken out from the main case of the present invention.
Figure 4:
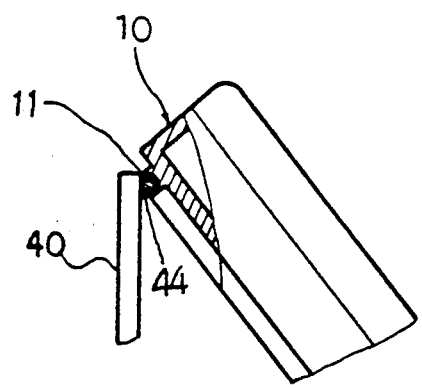
FIG. 4 is a partial sectional drawing of the present invention when viewed from 4—4 direction of FIG. 2.
Figures 6, 7:
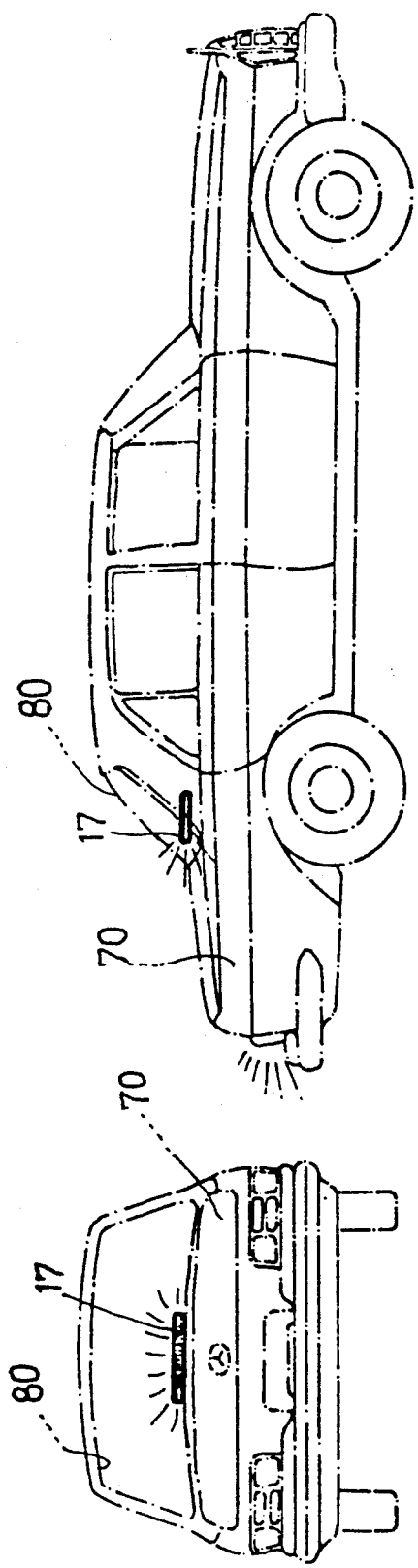
FIG. 6 is a side view illustration of a car having the present invention placed in a rear portion of the car.
FIG. 7 is a rear view of the car with the present invention put on a rear portion of the car.

By the way, the present invention besides the main warning effect by the main warning means 40 as shown in FIG. 2, the auxiliary warning means 17 may also be used in a car such as shown in FIGS. 6, 7 in which the bottom portion of the base frame 20 may be formed with several anti-sliding protrusions or pads (not shown) thereon.

The main warning means 40 includes: a light-reflective plate 41 generally triangular shaped or other shapes adapted for traffic warning purposes and preferably made of retroreflective material having a pivotal portion 44 formed on an upper portion of the light-reflective plate 41 to be pivotally secured with the first hinge 11 of the main case for extending the light-reflective plate 41 for warning display as shown in FIG. 2, and a lower plate portion 46 extendibly retained on the base frame 20 for supporting the light-reflective plate 41 which is extended for warning display, thereby operatively forming a generally triangular shape from a side view of an extended light-reflective plate 41 having its upper pivotal portion 44 pivotally secured to the main case 10 and having a lower plate portion 46 of the light-reflective plate 46 standing on the base frame 20 which is laid on a road or ground surface.

The light-reflective plate 41 includes a light-reflective layer 412 made of retroreflective material and engaged with at least a groove 411 recessed in a substrate plate portion 410 of the light-reflective plate 41.

The light-reflective layer 412 may also be made as transparent or translucent to transmit light from at least an auxiliary flashing illuminator 45 such as a light-emitting diode mounted in the groove 411 under the light-reflective layer 412, whereby upon a powering of the auxiliary flashing illuminator 45 electrically connected to a flasher circuit and a power source (not shown), a flashing light signal can be transmitted through the light-reflective layer 412 of the light-reflective plate 41 for an additional flashing warning purpose besides the retroreflective effect caused by the light-reflective layer 412.

The flashing illuminator 45 may also be powered by a plurality of solar cells 32 adhered on an upper surface portion of the upper cover 30 as shown in FIG. 1.

Figure 5B:
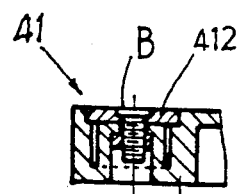
FIG. 5b is a partial sectional drawing of an enlarged view of the light-reflective plate as shown in portion "B" of FIG. 5.
Figure 5A:
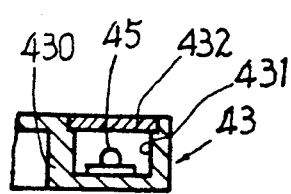
FIG. 5a is a partial sectional drawing of an enlarged view of a side-wing plate of a light-reflective plate of the present invention as shown in portion "A" of FIG. 5.
Figure 5:
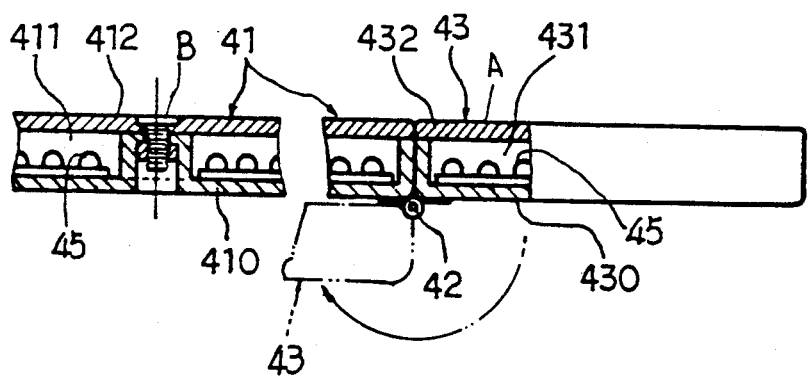
FIG. 5 is a sectional drawing of the present invention when viewed from 5—5 direction of FIG. 2.

As shown in FIGS. 2, 5, 5a, a pair of side-wing light-reflective plates 43 are pivotally secured with two opposite side portions of the light-reflective plate 41 by a pair of side-wing hinges 42 so that each side-wing plate 43 can be folded backwardly to fold and store the main warning means 40 into the lower chamber 12 of the main case 10 for storage and handling thereof.

Each side-wing light-reflective plate 43 may also be formed with a light-reflective layer 432 on a groove 431 which is recessed in a substrate plate portion 430. The LED illuminator 45 may also be mounted in the groove 431 as shown in FIG. 5, 5a.

The base frame 20 is generally parallelepiped shaped as shown in the figures including a first side frame 21 corresponding to the first side portion 101 of the main case 10, a second side frame 22 formed on a left side of the first side frame 21 having at least a pair of latch sockets 221 in the second side frame 22 engageable with the pair of side latches 15 on the main case 10 for combining the base frame 20 with the main case 10 when folding the main warning means 40 in the main case 10 and shielded by the base frame 20 as shown in FIG. 1, a third side frame 23 formed in a right side of the first side frame 21 pivotally secured with the third side portion 103 of the main case 10, and a fourth side frame 24 formed on a rear side portion of the first side frame 21; the first and the fourth side frames 21, 24 being juxtapositionally recessed with a plurality of retaining notches 211 for engaging a lower plate portion 46 of the light-reflective plate 41 of the main warning means 40 for stably extending the light-reflective plate 41 on the base frame 20 for warning display.

The upper cover 30 is pivotally secured to a fourth side portion 104 of the main case 10, and includes a pair of male locking members 31 operatively engageable with a pair of female locking members 19 formed in the main case 10 for combinably locking the upper cover on the main case 10 for sealably covering the first-aid kit 50 and the tool box 60 in the upper chamber 13 of the main case 10.

The first-aid kit 50 includes: a kit container 52 having sockets 521 for storing medicines or first-aid materials therein formed in the container 52 and a plurality of kit notches 51 formed in a bottom portion of the container 52 engageable with a plurality of protrusions 131 formed in the upper chamber 13 for stabilizing the kit 50 in the chamber 13, and a kit cover 53 covering the container 52 having a kit handle 531 for carrying the kit 50 outwardly from the upper chamber 13 for first-aid purpose.

The tool box 60 includes a plurality of box notches 61 formed in a bottom portion of the tool box 60 engageable with a plurality of protrusions 131 formed in the upper chamber 13 of the main case 10, a plurality of tool sockets 62 formed therein for storing a plurality of tools on the tool sockets 62, and a tool-box handle 63 pivotally formed therein for carrying the tool box 60 outwardly from the upper chamber 13 for repair or maintenance work.

However, the shapes of the box or plates of this invention are not limited in this invention.

I claim:

1. A portable travel box comprising:
a main warning means having a light-reflective plate foldably pivotally secured to a bottom portion of a main case and extendibly retained on a base frame which is extendibly dismantled from a bottom portion of the main case for a retroreflective warning purpose by an immediate extending operation of the light-reflective plate for warning a rear car positioned on a rear side of the travel box; an upper cover sealably formed on an upper portion of the main case having a first-aid kit and a tool box respectively detachably stored in an upper chamber formed in an upper portion of the main case to be covered by the upper cover, whereby upon an uncovering of the upper cover, said first-aid kit and said tool box are taken out from said main case respectively for first aid and maintenance purpose.

2. A travel box according to claim 1, wherein said main case includes: a parallelepiped case consisting of a first side portion, a second side portion positioned on a left side of the first side portion, a third side portion positioned on a right side of the first side portion and a fourth side portion positioned on a rear side of the first side portion; a first hinge formed on a bottom portion of the case positioned at the second side portion of the case for pivotally securing an upper portion of the main warning means; a lower chamber recessed in a bottom portion of the main case for foldably storing the main warning means in the lower chamber when not in use; the upper chamber recessed in an upper portion of the main case for storing the first-aid kit and the tool box in the upper chamber with the upper cover sealably covering the upper chamber; a second hinge formed at a third side portion of the main case for pivotally securing the base frame thereon; at least a pair of side latches protruding downwardly from the second side portion of the main case to engage a pair of latch sockets formed in the base frame for combinably engaging the base frame when folding the main warning means into the main case; and a handle pivotally secured to the first side portion of the main case.

3. A travel box according to claim 2, wherein said main case is further provided with an auxiliary warning means including at least a brake warning light on the first side portion of the main case which is placed on a rear portion inside a car adjacent to a trunk and a rear window of the car to allow a driver of a rearside car to observe the auxiliary warning light through the rear window.

4. A travel box according to claim 1, wherein said main warning means includes: a light-reflective plate made of retroreflective material having a pivotal portion formed on a first portion of the light-reflective plate to be pivotally secured with the first hinge of the main case for extending the light-reflective plate for warning display, and a second portion of the light-reflective plate opposite to the first portion extendibly retained on the base frame for supporting the light-reflective plate which is extended for warning display, thereby operatively forming a generally triangular shape from a side view of an extended light-reflective plate having its upper pivotal portion pivotally secured to the main case and having a lower plate portion of the light-reflective plate standing on the base frame which is laid on a road surface.

5. A travel box according to claim 4, wherein said light-reflective plate includes a light-reflective layer made of retroreflective material and engaged with at least a groove recessed in a substrate plate portion of said light-reflective plate.

6. A travel box according to claim 5, wherein said light-reflective layer is made as transparent or translucent to transmit light from at least an auxiliary flashing illuminator mounted in the groove under the light-reflective layer, whereby upon a powering of the auxiliary flashing illuminator electrically connected to a flasher circuit and a power source, a flashing light signal is transmitted through the light-reflective layer of the light-reflective plate for an additional flashing warning purpose besides the retroreflective effect caused by the light-reflective layer.

7. A travel box according to claim 6, wherein said flashing illuminator is powered by a plurality of solar cells adhered on an upper surface portion of the upper cover.

8. A travel box according to claim 4, wherein a pair of side-wing light-reflective plates are pivotally secured with two opposite side portions of the light-reflective plate by a pair of side-wing hinges so that each side-wing plate can be folded backwardly to fold and store the main warning means into a lower chamber of the main case for storage and handling thereof.

9. A travel box according to claim 2, wherein said base frame is generally parallelepiped shaped including a first side frame corresponding to the first side portion of the main case, a second side frame formed on a left side of the first side frame having at least a pair of latch sockets in the second side frame engageable with the pair of side latches on the main case for combining the base frame with the main case when folding the main warning means in the main case and shielded by the base frame, a third side frame formed in a right side of the first side frame pivotally secured with the third side portion of the main case, and a fourth side frame formed on a rear side portion of the first side frame; the first and the fourth side frames being juxtapositionally recessed with a plurality of retaining notches for engaging a lower plate portion of the light-reflective plate of the main warning means for stably extending the light-reflective plate on the base frame for warning display.

10. A travel box according to claim 2, wherein said upper cover is pivotally secured to a fourth side portion of the main case, and includes a pair of male locking members operatively engageable with a pair of female locking members formed in the main case for combinably locking the upper cover on the main case for sealably covering the first-aid kit and the tool box in the upper chamber of the main case.

11. A travel box according to claim 10, wherein said first-aid kit includes: a kit container having sockets for storing medicines and first-aid materials therein formed in the container and a plurality of kit notches formed in a bottom portion of the container engageable with a plurality of protrusions formed in the upper chamber for stabilizing the kit in the chamber, and a kit cover covering the container having a kit handle for carrying the kit outwardly from the upper chamber for first-aid purpose.

12. A travel box according to claim 10, wherein said tool box includes a plurality of box notches formed in a bottom portion of the tool box engageable with a plurality of protrusions formed in the upper chamber of the main case, a plurality of tool sockets formed therein for storing a plurality of tools in the tool sockets, and a tool-box handle pivotally of tools in the tool sockets, and a tool-box handle pivotally formed therein for carrying the tool box outwardly from the upper chamber for repair or maintenance work.

* * * * *